United States Patent [19]

Brenta

[11] 4,105,055
[45] Aug. 8, 1978

[54] PORTABLE WORKSHOP

[75] Inventor: Robert Brenta, 36-31 12th St., Long Island City, N.Y. 11106

[73] Assignee: Robert Brenta, Long Island City, N.Y.

[21] Appl. No.: 719,411

[22] Filed: Sep. 1, 1976

[51] Int. Cl.² ............................................. B25H 1/04
[52] U.S. Cl. .................................. 144/286 R; 83/574; 108/13; 108/157; 144/1 R; 144/134 R; 144/134 D
[58] Field of Search .......... 144/1 R, 1 G, 1 E, 134 R, 144/134 A, 134 D, 285, 286 R, 286 A, 287, 253 R, 253 F, 35 R, 35 A; 83/471, 471.2, 485, 471.3, 574, 821, 827, 828; 248/13; 108/13, 19, 157

[56] References Cited

U.S. PATENT DOCUMENTS

| | | | |
|---|---|---|---|
| 1,758,834 | 5/1930 | Heston et al. | 144/253 F X |
| 2,599,096 | 6/1952 | Dirksen | 144/286 |
| 2,739,624 | 3/1956 | Haddock | 83/574 |
| 3,071,889 | 1/1963 | Silver | 144/35 A |
| 3,316,946 | 5/1967 | Ryan et al. | 144/1 R |
| 3,320,982 | 5/1967 | Kwiatkowski | 83/574 |
| 3,342,226 | 9/1967 | Marcoux et al. | 144/286 R |
| 3,384,135 | 5/1968 | Frydenlund | 83/471.3 |
| 3,734,151 | 5/1973 | Skripsky | 144/1 R |
| 3,827,326 | 8/1974 | Martin | 83/574 |

*Primary Examiner*—Othell M. Simpson
*Assistant Examiner*—W. D. Bray
*Attorney, Agent, or Firm*—Richard L. Miller

[57] ABSTRACT

A portable kit which can be quickly and easily set up so to operate either as a circular saw, a table saw, jig saw, or wood shaper; the kit including a portable case for being carried in a hand, and containing a collapsable table, a wood and a metal table top for placement on the table, a set of power tools comprising a circular saw, a jig saw, and a router for selectively being mounted on one of the table tops so to perform more precise machining of wood than is possible with a hand held tool.

4 Claims, 21 Drawing Figures

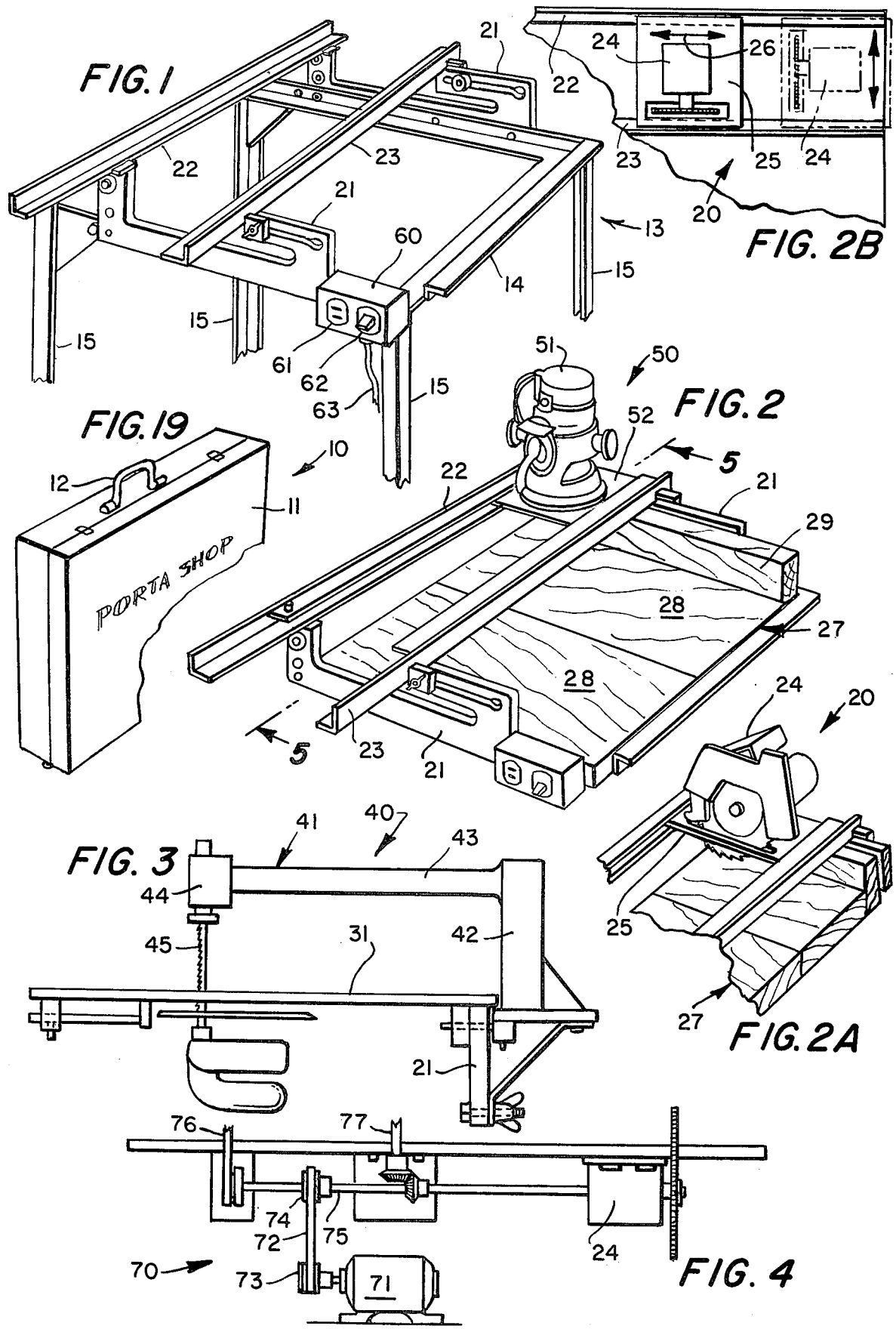

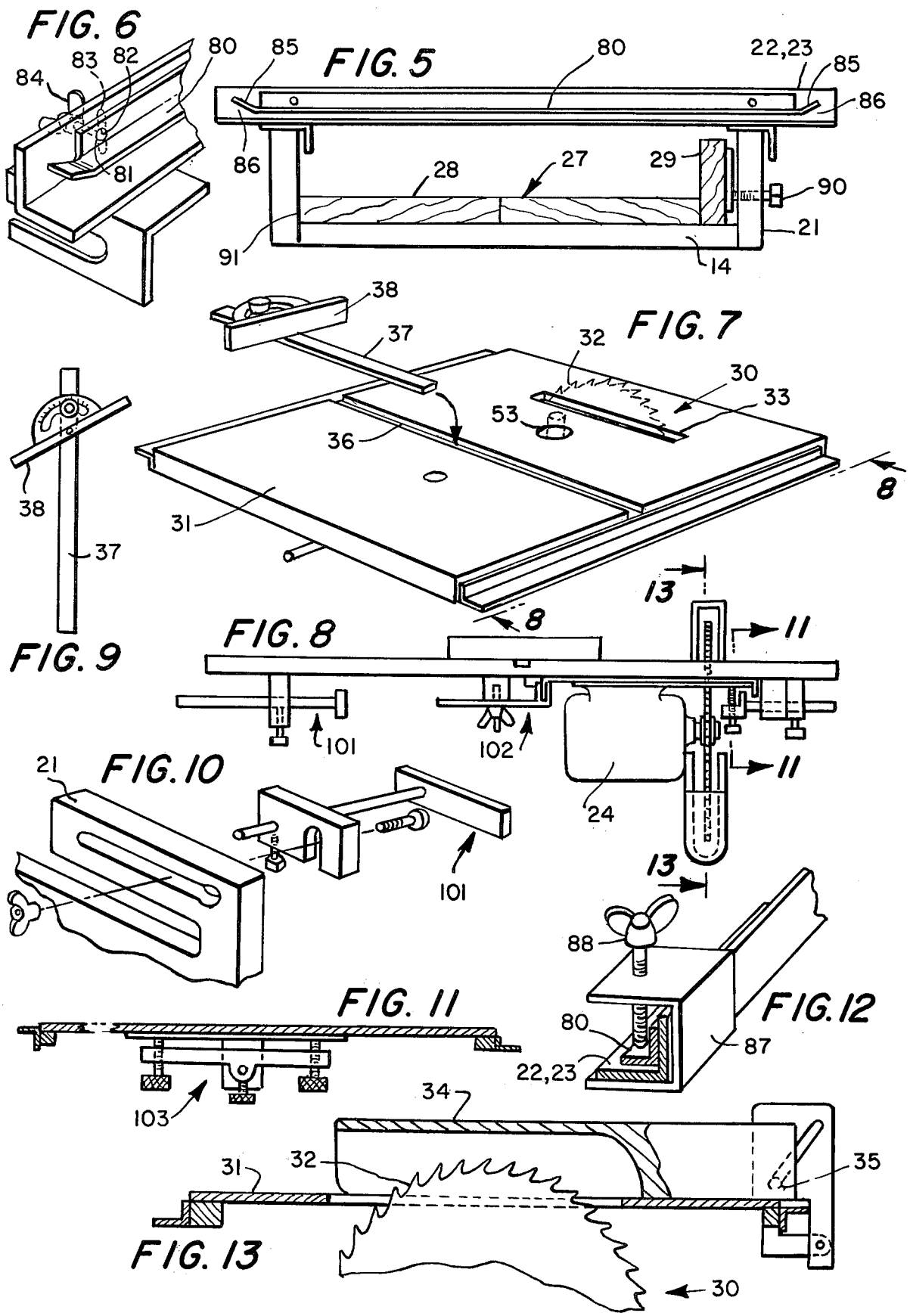

PORTABLE WORKSHOP

This invention relates generally to combination tools.

It is well known that most woodworking machines are heavy and cumbersome so that they cannot be readily transported from place to place without use of a truck, so that it becomes a laborious task to load and unload them off the truck when being used for itinerary jobs. This situation is of course, objectionable, and is therefore in want of an improvement.

Accordingly, it is a principal object of the present invention to provide a kit that is readily portable so to be carried by hand and which incorporates four different woodworking machines, each of which can be set up in an expeditious manner.

Another object is to provide a kit that includes a circular saw, a table saw, a jig saw, and a wood shaper.

Still another object is to provide a kit which thus forms a portable shop, which by eliminating laborious moving difficulty, saves time and thus keeps down costs for each job.

Still another object is to provide a Porta Shop that can be easily carried inside an automobile trunk compartment.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the frame.

FIG. 2 is a perspective view of the table fitted with board and set up for use with a router.

FIG. 2A is a fragmentary perspective view, similar to FIG. 2, and showing a circular saw instead installed upon the table.

FIG. 2B is a top view showing in solid lines and in phantom lines, the circular saw to make a cross cut and a rip cut respectively.

FIG. 3 is a side view of the table with jig saw set up.

FIG. 4 is a side view of a drive of the invention.

FIG. 5 is a view in direction 5—5 of FIG. 2.

FIG. 6 is an enlarged detail thereof in perspective.

FIG. 7 shows the table set up with circular saw.

FIG. 8 is a view in direction 8—8 of FIG. 7.

FIG. 9 is a top view of a guide fence shown in FIG. 7.

FIG. 10 shows a securement structure for the table.

FIG. 11 is a cross-section on line 11—11 of FIG. 8.

FIG. 12 shows a clamp for the track.

FIG. 13 is a cross-section on line 13—13 of FIG. 8.

FIG. 19 is a view of a carrying case for containing the Porta Shop.

Figure 14:
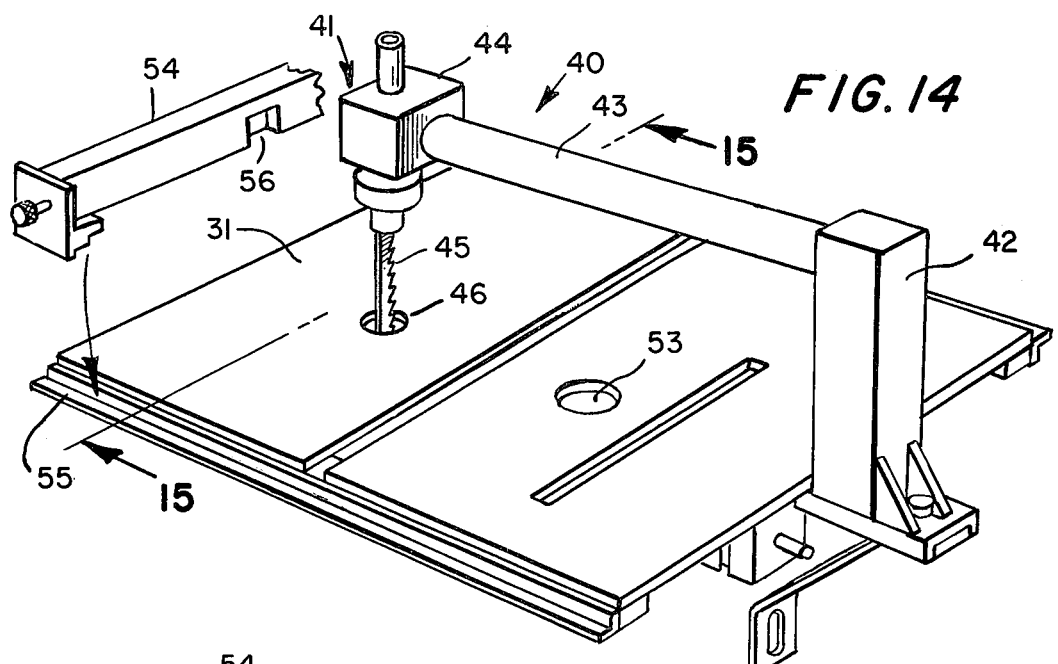
FIG. 14 shows a set up for a jig saw.

Referring now to the drawings in greater detail, the reference numeral 10 represents a Porta Shop according to the present invention and which can be readily dismantled so to fit into a 25×21×6 inches case 11 having a handle 12 in order that it can be carried easily by hand.

The Porta Shop includes a table 13 that can be quickly set up by bolting together a metal frame 14 and metal vertical legs 15. Upon the frame 14 various components of the Porta Shop can be placed or secured so to selectively assemble either a circular saw 20, a table saw 30, a jig saw 40, or a wood shaper 50.

The Porta Shop also includes several standard, portable hand electric tools for its operation. These portable electric tools, are such as are available in any hardware store and include a jig saw, electric saw, a router, etc. These tools when being hand held in use cannot do accurate and precision work, but can do so when incorporated into the Porta Shop where they are supported in a stable manner.

When the Porta Shop is set up as a circular saw 20, a bracket 21 is secured to opposite sides of the frame 14 as shown in FIG. 1, the brackets supporting parallel, spaced apart rails 22 and 23 upon which a portable circular saw 24, mounted upon a panel 25, is supported. When the panel is placed upon the rails are shown in FIG. 2A, it can be clamped to the rails in a selected position so to make saw cuts on works that are moved under the rails in a direction at right angle to the rails. However, when the panel 25 is turned 90° so that the saw blade is parallel to the rails, the panel can then be slid along the rails as shown by double headed arrow 26 in FIG. 2B so that a workpiece can be held stationary while the saw is slid so to make a rip or cross cut thereupon. The position of the saw, shown in FIG. 2A is also shown by dotted lines on FIG. 2B for purposes of comparison to its position when used for sliding along the rails.

The lumber or boards sawn by the circular saw 20 are placed upon a wooden table top 27 shown in FIGS. 2, 2A and 5, and which nests within the frame 14; the table top 27 including horizontal boards 28 and a vertical board 29 along one end edge thereof so to form a wall against which the work abutts while being slid under the saw.

When the Porta Shop is set up as a table saw 30, as shown in FIGS. 7, 8, and 13, a metal table top 31 is nested in the frame 14; the portable circular saw 24 being mounted to an underside of the table top 31 so that the saw blade 32 protrudes upwardly above the upper surface of the table top through a slot 33. A conventional saw blade guard 34 pivotally supported on a pin 35 protects a person or other objects accidentally contacting the blade while in operation.

A groove 36 across a top of the table top 31 receives a tongue 37 of an angularly adjustable stop wall 38 against which a work abutts while being slid under the guard 34 and against the saw blade 32.

When the Porta Saw is used as a jig saw 40, as shown in FIGS. 3 and 14, a portable jig saw 41 is secured to one of the brackets 21; the jig saw including an electric motor housing 42, an arm 43, and head unit 44, containing gearing for reciprocally sliding a saw blade 45 up and down through an opening 46 in the metal table top 31.

When used as a wood shaper 50, as shown in FIG. 2, the Porta Shop can be set up the same as for the circular saw, except that instead of the circular saw 24, a portable router 51, secured upon a panel 52, can be placed upon the rails 22 and 23 so to slide there along and cut a routed groove in a work placed upon the wooden table top 27.

In an alternate mounting, the wood shaper 50 can comprise the router 51 being mounted stationary on an underside of the metal table top in a similar manner as the circular saw is mounted. A shaft of the router the protrudes upwardly through an opening 53 in the metal table top so to carry a cutter head thereupon. In this form the work is slid upon the table top while the router is stationary.

Figure 15:
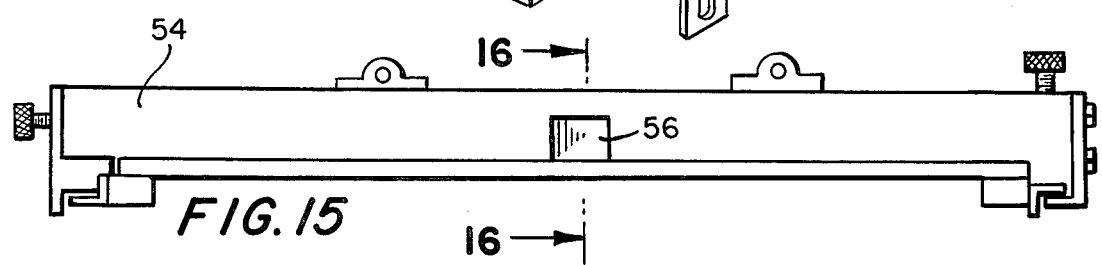
FIG. 15 is a view of a fence as viewed in direction 15—15 of FIG. 14.
Figure 16:
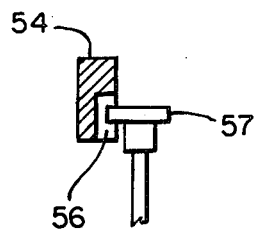
FIG. 16 is a cross-section on line 16—16 of FIG. 15.
Figure 18:
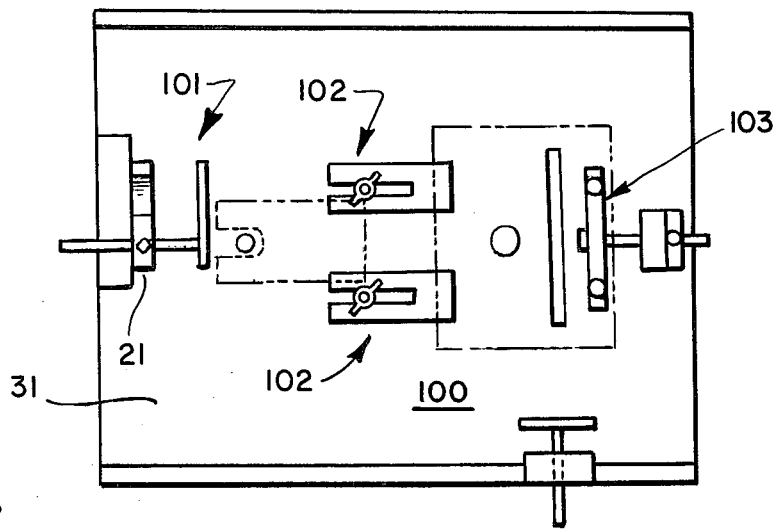
FIG. 18 is a bottom view of the table.
Figure 17:
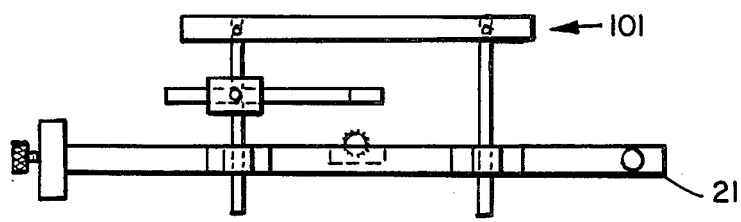
FIG. 17 is a top view of the fence with mechanism attached thereto.

A guide 54, shown in FIGS. 14, 15, and 16, is adjustably secured to an edge 55 of the metal table top and which serves as a wall along which a work can slide while being cut by the router. A notch 56 in the guide 54 serves to clear the router cutter head 57 on close work.

An electrical box 60, shown in FIG. 1, can be attached to the frame 14, the box containing an outlet socket 61 in which extension cords of the various power tools used can be plugged. The box also has a main switch 62 from which an extension cord 63 is provided for being plugged into a household electric outlet socket.

For a permanent installation, power to the various power tools can be provided through a system 70 shown in FIG. 4, wherein there is an electric motor 71 mounted under the table 13 and which through a belt 72 and pulleys 73 and 74 drives a shaft 75, which through gearing shown, drives either the circular saw 24, a jig saw plunger 76 or a shaper spindle 77.

Referring now to FIGS. 5 and 6, it is to be noted that each rail 22 and 23 has a hold down bar 80 adjustably secured thereto by means of bolts 81 passed through openings 82 in the hold down bar and through vertical slots 83 in the rails, the bolts being fitted with wing nuts 84. The hold down bars are made of angle irons similar to the rails. The hold down bars prevent the power tools from being upwardly lifted during operation so to insure precision work. The ends 85 of the hold down bars are upwardly bent so to form wide entrances 86 for insertion of panels 25 or 52 upon the rails.

In FIG. 12 a U-shaped bracket 87 and wing bolt 88 is shown for firmly locking the hold down bar against the panels 25 or 52 when the machines are intended not to slide on the rails.

FIG. 5 also illustrates how the wooden table top 27 is rigidly held in the frame 14 by means of bolts 90 through one of the brackets 21 bearing against the vertical board 29 so that an opposite side edge 91 of the table top 26 bears against the frame, thus rigidly locating the position of board 28 which is used for work to rest thereagainst during operation.

In FIGS. 8, 10, 11, 17, and 18, various attachments are shown for securing the various power tools to the underside 100 of the metal table top 31; the attachments being designed so to suit the particular constructions or shapes of the power tool housings as is readily evident. These attachments include clamping units such as shown at 101, 102, and 103, the detail constructions of which are readily evident upon a study of the drawings.

Thus a practical Porta Shop is provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A portable, collapsible shop comprising, in combination, a table having a generally rectangular, horizontal frame mounted on vertical legs, a pair of brackets mounted on opposite sides of said frame, a pair of spaced apart rails mounted on said brackets transversely spanning said frame and spaced on top thereof, a plurality of conventional portable power tools including a circular saw, a jig saw, and a router, a wooden table top capable of securely fitting onto said frame, a metal table top capable of securely fitting onto said frame alternatively with said wooden top, said metal table top comprising spaced apart openings, each opening appropriately shaped to accommodate therein the operative portion of a respective one of said circular saw, said jig saw and said router, respective attachment means for said circular saw and router for alternative placement on said rails for slidable travel or rigid securement thereupon and for use in conjunction with said wooden table top, clamping means coupled to said metal table top for respectively securing said circular saw and said router to appropriate positions on the underside of said metal table top with their operative portions extending into their respective openings in said metal table top, arm means coupling said jig saw to said table and positioning it above the table with its operative portion extending into its respective opening in said metal table top, and a carrying case for carrying the tools and parts of said portable collapsible shop.

2. The combination as in claim 1 and further comprising a groove formed transversely across said metal table top, an elongated tongue portion fitting in said groove with its top surface being planar with the table top, and an angularly adjustable stop wall transversely coupled to said tongue portion.

3. The combination as in claim 1 and wherein said frame includes a seat portion on three sides thereof to receive and support said table tops, the fourth side of said frame being open.

4. The combination as in claim 1 and further comprising guide means coupled to said frame and adjustably slidable across said metal table top, and a notch formed in said guide means to accommodate the extending operative portion of the router to thereby permit close work against said router.

* * * * *